United States Patent Office 3,553,090
Patented Jan. 5, 1971

3,553,090
METHOD FOR THE STABILIZING OF POLYOXY-METHYLENE USING HIGH ENERGY RADIATION AND ACETIC ANHYDRIDE
Hisao Yamashina and Akihiko Ito, Takasaki-shi, Tadashi Iwai, Miura-gun, Kanagawa-ken, Koichiro Yayashi, Osaka-fu, and Seizo Okamura, Kyoto-shi, Japan, assignors to Japan Atomic Energy Research Institute
No Drawing. Filed May 12, 1967, Ser. No. 637,890
Claims priority, application Japan, May 21, 1966, 41/32,153
Int. Cl. C08f 1/16
U.S. Cl. 204—159.21                                   9 Claims

ABSTRACT OF THE DISCLOSURE

The present disclosure is directed to esterification of highly crystalline polyoxymethylene induced by ionizing radiation in the presence of acetic anhydride. The polyoxymethylene of highly crystalline structure, which is not easily esterified, is now thoroughly esterified in a heterogenous system at rather low temperature by applying an ionizing radiation and thus its thermal stability is remarkably improved.

---

It is well known to produce thermally and chemically stabilized polyoxymethylene by esterifying the chain ends of ordinary polyoxymethylene produced by catalytic polymerization of anhydrous formaldehyde. This esterification is carried out by means of a catalytic heterogenous reaction.

Nowadays highly crystalline polyoxymethylene of high molecular weight is produced from an aqueous solution of formaldehyde or by irradiating crystalline trioxane with ionizing radiation such as gamma rays, beta rays or others or by catlytic polymerization of trioxane in liquid phase. However, we have found, and it is now widely known, that such highly crystalline polyoxymethylene cannot be satisfactorily esterified by the known method as stated above. Since attempts to esterify such highly crystalline polyoxymethylene by means of heterogenous reaction in the prior art failed, esterification in a homogenous system at higher temperatures at which the polyoxymethylene is dissolved in acetic anhydride was tried. Though such high temperature esterification partly succeeded, undesirable side effects such as discoloration of the polymer and, even worse, decomposition of the polymer itself were caused. In particular, part of the chain ends of the molecule of polyoxymethylenes produced from trioxane by the above method has been found to be quite different from the hydroxy groups that constitute the chain ends of ordinary polyoxymethylene molecules. Thus esterification of polyoxymethylene of this type is difficult even by the high temperature esterification method.

We have now found that the thermal stability of highly crystalline polyoxymethylene can be remarkably improved by irradiating said polyoxymethylene with an ionizing radiation in acetic anhydride, and, further, decomposition of the polymer, that is to say, a decrease in the molecular weight of said polymer resulting from the irradiation is diminished by adding a small amount of pyridine to the reaction system.

SUMMARY OF THE INVENTION

This invention relates to a method of stabilizing highly crystalline polyoxymethylene by esterfying the chain ends of said polyoxymethylene in a heterogenous system by means of an ionizing radition in the presence of acetic anhydride and further relates to diminishing the decomposition of the polyoxymethylene due to irradiation in the course of said esterification by addition to the reaction system of a small amount of pyridine.

This method is also applicable to the esterification of ordinary polyoxymethylene.

In carrying out this stabilizing method, the properties of the obtained stabilized polyoxymethylene are scarcely influenced by the atmosphere of the reaction system such as air, nitrogen or vacuum, though the initial decomposition rate of polyoxymethylene stabilized in the presence of air is slightly greater than that of the other products. With respect to the radiation dose and the reaction temperature, there are no definite limitations, but the preferable dose is between $2 \times 10^5$ roentgens and $2 \times 10^6$ roentgens and the preferable reaction temperature range is 100–150° C.

The ionizing radiation applicable to this invention includes electromagnetic radiation with short wave length such as gamma rays or X-rays; high speed beams of electrons, protons, deuterons, alpha particles or nuclear fission fragments; and beams of neutral particles such as high speed neutrons, low speed neutrons or thermal neutrons.

The radiation may be applied to the polymer simultaneously with or before its contact with the acetic anhydride.

The thus purely colorless and thoroughly stabilized polyoxymethylene can be obtained in good yield.

DESCRIPTION OF THE PREFERRED EMBODIMENTS

The invention will now be illustrated by way of examples. Hereinafter, thermal stability of the polymer is indicated by $R_{222}^{60}$ which means the weight percentage of residual polymer when a polymer suffers a decomposition treatment in a nitrogen flow at 222° C. for 60 minutes, and intrinsic viscosity of the polymer is indicated by $[\eta]$, which is determined by measuring the viscosity of the polymer dissolved in p-chlorophenol containing 2% (by weight) of alpha-pinene at 60° C.

EXAMPLE 1

The polyoxymethylene used in this example is produced in the following process. Trioxane which has been purified by distillation is rapidly cooled to be solidified, and fine crystalline powder was obtained. This power was irradiated by an electron beam from a 2 mev. electron accelerator at a dose rate of $2 \times 10^5$ rad/sec. (the total dose is $1 \times 10^6$ rad), and thereafter, post-polymerization was continued at 55° C. for 3 hours to obtain a fibrous polymer. $[\eta]$ of the polymer was 1.87 and the thermal stability $R_{222}^{60}$ was 26%. The degree of crystallization of that polyoxymethylene measured by X-ray at room temperature and by broad line spectrum of NMR at 100° C. was 100% and 78% respectively.

This polyoxymethylene (0.5 g.) and active anhydride (10 ml.) (in some samples an additional 0.4 mil. of pyridine was added) were charged in a glass ampoule and the ampoule was sealed in air. This ampoule was subjected to $1 \times 10^6$ roentgens of gamma rays from cobalt=60 for 2 hours.

After irradiation, the polymer was separated by means of filtration and a centrifugal separator from liquid materials, and was washed with acetone and dried at 50° C. for 5 hours, and then the thermal stability was measured.

The results are shown in Table 1.

TABLE 1

| Reaction temp. (° C.) | Without pyridine | | Pyridine added | |
|---|---|---|---|---|
| | Yield (percent) | $R_{222}{}^{60}$ | Yield (percent) | $R_{222}{}^{60}$ |
| 20 | 97 | 63 | 99 | 62 |
| 45 | 95 | 62 | 97 | 62 |
| 90 | 91 | 71 | 90 | 70 |
| 130 | 87 | 82 | 96 | 79 |

Tests for comparison were carried out.

(1) The above-mentioned polyoxymethylene was subjected to conventional heterogeneous acetylation with pyridine as the catalyst at 130° C. for 2 hours. Yield and thermal stability of the thus acetylated polyoxymethylene was as follows:

Yield 95%, $R_{222}{}^{60}$ 49%

(2) The above-mentioned polyoxymethylene was irradiated in air and in vacuo by the same dose of the same radiation in the absence of acetic anhydride at 90° C. The yield and thermal stability were as follows:

In the air: Yield 98%, $R_{222}{}^{60}$ 55%
In vacuo: Yield 99%, $R_{222}{}^{60}$ 51%

EXAMPLE 2

The same polyoxymethylene as used in Example 1 (0.5 g.) and acetic anhydride (10 ml.) (in some samples, 0.4 ml. of pyridine was added) were charged in a glass ampoule, the head space of the ampoule was fully replaced with nitrogen and the ampoule was sealed in a nitrogen atmosphere. The samples were subjected to gamma rays from cobalt-60 of various dose rates at 130° C. for 2 hours. The results are shown in Table 2.

TABLE 2

| Dose (r.) | Without pyridine | | | Pyridine added | | |
|---|---|---|---|---|---|---|
| | Yield (percent) | $R_{222}{}^{60}$ (percent) | $[\eta]$ | Yield (percent) | $R_{222}{}^{60}$ (percent) | $[\eta]$ |
| 2×10⁵ | 91 | 75 | 1.30 | 99 | 75 | 1.30 |
| 10×10⁵ | 87 | 83 | 0.30 | 99 | 81 | 0.60 |
| 20×10⁵ | 91 | 85 | 0.36 | 99 | 82 | 0.46 |

EXAMPLE 3

Five hundred (500) grams of the same polyoxymethylene as used in Example 1, and 5 l. of acetic anhydride were charged in a cylindrical vessel made of glass 20 cm. in diameter and 30 cm. in height. The vessel was placed on a plate which was rotated at 1 r.p.m. and was subjected to $1 \times 10^6$ roentgens of gamma radiation from cobalt-60 at room temperature, and 492 g. of stabilized polyoxymethylene was obtained. The yield was 98% and its $R_{222}{}^{60}$ was 63%.

EXAMPLE 4

One hundred (100) g. of trioxane, and 240 ml. of nitrobenzene were placed in a three-necked flask and immersed in a constant temperature bath at 30° C. While the mixture in the flask was stirred by a propeller, 17 ml. of nitrobenzene containing 0.043 ml. of boron trifluoride-ethyl ether complex was added. After the 10 minute induction period, polymerization took place and polyoxymethylene in powder form was separated from the mixture. Its $[\eta]$ was 1.38 dl./g. and $R_{222}{}^{60}$ was 56%. The degree of crystallization of this polyoxymethylene measured by broad line spectrum of NMR was 78% at 100° C.

This polyoxymethylene (0.5 g.) and acetic anhydride (10 ml.) were placed in a glass ampoule and the ampoule was sealed in vacuo. The ampoule was subjected to $1 \times 10^6$ roentgens of gamma radiation from cobalt-60 at 130° C. for 4 hours.

After irradiation the polymer was treated as described in Example 1. The yield, $R_{222}{}^{60}$ and $[\eta]$ were 92%, 82% and 0.4 dl./g. respectively.

EXAMPLE 5

Anhydrous formaldehyde was polymerized by bubbling same in benzene containing tetramethylthiuram disulfide as catalyst at room temperature. The $[\eta]$ of this polyoxymethylene was 1.8 and its crystallinity measured by X-ray was 78%. It decomposed so rapidly at 222° C. in a nitrogen atmosphere that the weight percentage of the residual polymer after 10 minutes was 35%.

This polyoxymethylene was irradiated and treated as described in Example 4 except that the ampoule was sealed in air and irradiated at 90° C. The yield, $R_{222}{}^{60}$ and $[\eta]$ were 90%, 82% and 0.4 dl./g. respectively.

EXAMPLE 6

The polyoxymethylene used in this example is produced by the following process.

Trioxane which has been dried with baked BaO, sublimed into a glass ampoule and sealed. All the above-mentioned steps were carried out in vacuo.

The ampoule was subjected to $1 \times 10^6$ roentgens of gamma radiation from cobalt-60 for 2 hours at $-78°$ C., and thereafter post-polymerization was continued at 55° C. for 48 hours. The intrinsic viscosity $[\eta]$ of the produced polymer was 3.5 and $R_{222}{}^{60}$ was 19%.

This polyoxymethylene (0.5 g.), 20 ml. of acetic anhydride and 0.5 ml. of pyridine were placed in a glass ampoule and the ampoule was sealed in air. The ampoule was subjected to $5 \times 10^5$ roentgens of gamma radiation from cobalt-60 for 2 hours.

After irradiation, the polymer was treated as described in Example 1. The yield, $R_{222}{}^{60}$ and $[\eta]$ were 98%, 88% and 0.9 dl./g. respectively.

EXAMPLE 7

The same polyoxymethylene as used in Example 1 (0.5 g.) was sealed in vacuo in a glass ampoule and was subjected to $1.5 \times 10^6$ roentgens of the same gamma radiation at room temperature.

The irradiated polyoxymethylene was contacted with acetic anhydride for 1 hour at 130° C.

The yield, $R_{222}{}^{60}$ and $[\eta]$ were 88%, 84% and 0.5 dl./g. respectively.

EXAMPLE 8

The same polyoxymethylene as used in Example 4 (10 g.) was packed in a polyethylene bag and was subjected to $0.9 \times 10^6$ rad of electron beams generated by a 2 mev. electron accelerator, while the bag was dipped in a methanol-Dry Ice cryogen.

The irradiated polyoxymethylene was contacted with acetic anhydride for 1 hour at 130° C.

The $R_{222}{}^{60}$ of the thus stabilized polyoxymethylene was 79%.

The above examples are for illustration only, and the scope of this invention is not to be limited thereto. It is well known to persons skilled in the art that radiations mentioned hereinbefore provoke ionization of chemical substance and thus act quite in the same way as gamma rays and beta rays which have been referred to in the examples. Such fact is, for example, described in "Radiation Chemistry of Polymeric Systems" by A. Chapiro, Interscience Publishers, New York, 1962, pp. 1–36.

What we claim is:

1. A method of stabilizing polyoxymethylene comprising reacting polyoxymethylene with acetic anhydride under the influence of a dose of high energy radiation sufficient to effect acetylation of said polyoxymethylene.

2. A method as set forth in claim 1, wherein said high energy ionizing radiation is applied to the polyoxymethylene while same is in contact with the acetic anhydride.

3. A method as set forth in claim 1, wherein said high energy ionizing radiation is applied to the polyoxymethylene before same is contacted with the acetic anhydride.

4. A method as set forth in claim 1, wherein reacting is effected in the presence of a catalytic amount of pyridine.

5. A method as set forth in claim 4, wherein said high energy ionizing radiation is applied to the polyoxymethylene while same is in contact with the acetic anhydride.

6. A method as set forth in claim 4, wherein said high energy ionizing radiation is applied to the polyoxymethylene before same is contacted with acetic anhydride.

7. A method as set forth in claim 1 wherein the polyoxymethylene is a highly crystalline polyoxymethylene of high molecular weight.

8. A method as set forth in claim 1, wherein the dose of high energy radiation is between $2 \times 10^5$ and $2 \times 10^6$ roentgens.

9. A method as set forth in claim 1, wherein reacting is effected at a temperature of 100–150° C.

References Cited

UNITED STATES PATENTS

| | | | |
|---|---|---|---|
| 2,998,409 | 8/1961 | Nogare et al. | 260—67 |
| 3,125,551 | 3/1964 | Punderson | 260—67 |
| 3,309,296 | 3/1967 | Fukui et al. | 204—159.21 |
| 3,326,789 | 6/1967 | Wakasa et al. | 204—159.21 |

MURRAY TILLMAN, Primary Examiner

R. B. TURER, Assistant Examiner

U.S. Cl. X.R.

260—67